United States Patent
Lee et al.

(10) Patent No.: US 9,215,747 B2
(45) Date of Patent: Dec. 15, 2015

(54) METHOD AND APPARATUS OF PEER LINK SETTING, AND METHOD AND APPARATUS OF CHANNEL SWITCHING, IN WIRELESS MESH NETWORK

(71) Applicant: ELECTRONICS AND TELECOMMUNICATIONS RESEARCH INSTITUTE, Daejeon (KR)

(72) Inventors: Jae Seung Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 146 days.

(21) Appl. No.: 13/651,306

(22) Filed: Oct. 12, 2012

(65) Prior Publication Data

US 2013/0136016 A1    May 30, 2013

(30) Foreign Application Priority Data

Oct. 13, 2011   (KR) .................. 10-2011-0104859
Oct. 13, 2011   (KR) .................. 10-2011-0104860
Nov. 3, 2011    (KR) .................. 10-2011-0114104
Oct. 11, 2012   (KR) .................. 10-2012-0112825
Oct. 11, 2012   (KR) .................. 10-2012-0112912

(51) Int. Cl.
   *H04L 12/58*   (2006.01)
   *H04W 4/00*    (2009.01)
   *H04L 12/56*   (2006.01)
   *G06F 15/16*   (2006.01)
   (Continued)

(52) U.S. Cl.
   CPC ............... *H04W 84/12* (2013.01); *H04L 45/00* (2013.01); *H04W 8/22* (2013.01); *H04W 16/32* (2013.01); *H04W 84/18* (2013.01)

(58) Field of Classification Search
   CPC ...... H04W 84/12; H04W 84/18; H04W 16/32; H04W 8/22; H04L 45/00
   USPC ................ 370/241, 311, 328, 338, 254, 406; 714/12; 380/258, 277; 455/449; 709/252
   See application file for complete search history.

(56) References Cited

U.S. PATENT DOCUMENTS 7,814,322 B2    10/2010   Gurevich et al.
8,255,714 B2 *   8/2012   Singh et al. .................... 713/320

(Continued)

OTHER PUBLICATIONS

Xavier Pérez-Costa et al., "AU-APSD: Adaptive IEEE 802.11e Unscheduled Automatic Power Save Delivery", IEEE, Jun. 2006, pp. 2020-2027, vol. 5.

(Continued)

*Primary Examiner* — Alpus H Hsu
*Assistant Examiner* — Camquyen Thai

(57) ABSTRACT

A method and apparatus for configuring mesh peer link and a method and apparatus for switching channel in wireless mesh network are provided. A method of configuring a mesh peer link in a wireless mesh network includes a first mesh station transmitting a mesh peering open frame to a second mesh station, and the first mesh station receiving a mesh peering confirm frame from the second mesh station in response to the mesh peering open frame, wherein the first mesh station and the second mesh station support a very high throughput (VHT), and wherein the mesh peering open frame and the mesh peering confirm frame comprise a VHT capability information element.

8 Claims, 12 Drawing Sheets

(51) Int. Cl.
　　　*H04W 40/00*　　　(2009.01)
　　　*H04W 84/12*　　　(2009.01)
　　　*H04L 12/701*　　(2013.01)
　　　*H04W 8/22*　　　(2009.01)
　　　*H04W 16/32*　　(2009.01)
　　　*H04W 84/18*　　(2009.01)

(56) References Cited

U.S. PATENT DOCUMENTS

| | | | |
|---|---|---|---|
| 2007/0189249 | A1* | 8/2007 | Gurevich et al. ............. 370/338 |
| 2008/0226071 | A1* | 9/2008 | Braskich et al. ............. 380/258 |
| 2009/0122755 | A1* | 5/2009 | Seok et al. .................... 370/329 |
| 2010/0177755 | A1 | 7/2010 | Chu et al. |
| 2011/0007678 | A1* | 1/2011 | Kneckt et al. ................. 370/311 |
| 2011/0110349 | A1* | 5/2011 | Grandhi ........................ 370/338 |
| 2011/0176481 | A1* | 7/2011 | Purnadi et al. ................ 370/328 |
| 2011/0222408 | A1* | 9/2011 | Kasslin et al. ................ 370/241 |
| 2011/0225440 | A1 | 9/2011 | Kwon et al. |

OTHER PUBLICATIONS

Guido R. Hiertz, "IEEE 802.11S: WLAN Mesh Standardization and High Performance Extensions", IEEE Network, May-Jun. 2008, pp. 12-19, vol. 22.

* cited by examiner

FIG. 3

| Order | Information | Notes |
|---|---|---|
| ..... | ..... | |
| 19 | VHT Capabilities | VHT capabilities element exists when dot11VHTOptionImplemented attribute is true. |
| 20 | VHT Operation | VHT operation element exists when dot11VHTOptionImplemented attribute is true. |
| ..... | ..... | ..... |

FIG. 4

| Order | Information | Notes |
|---|---|---|
| ..... | ..... | |
| 15 | VHT Capabilities | VHT capabilities element exists when dot11VHTOptionImplemented attribute is true. |
| 16 | VHT Operation | VHT operation element exists when dot11VHTOptionImplemented attribute is true. |
| ..... | ..... | ..... |

| Bits: | B0 B1 | B1 B2 B3 | B3 B4 | B5 | B6 | B7 B8 | B9 B10 | B11 | B12 | B13 B14 B15 |
|---|---|---|---|---|---|---|---|---|---|---|
| | Maximum MPDU Length | Supported Channel Width Set | Rx LDPC | Shot GI for 80 MHz | Shot GI for 160 and 80+80 MHz | Tx STBC | Rx STBC | SU Beam-former Capable | SU Beam-formee Capable | Compressed Steering Number of Beamformer Antennas Supported |
| | (411) | (412) | (413) | (414) | (415) | (416) | (417) | (418) | (419) | (420) |
| | 2 | 2 | 1 | 1 | 1 | 1 | 3 | 1 | 1 | 3 |

| Bits: | B16 B17 B18 | B19 | B20 | B21 | B22 | B23 B24 B25 | B26 B27 | B28 | B29 | B30 B31 |
|---|---|---|---|---|---|---|---|---|---|---|
| | Number Of Sounding Dimensions | MU Beam-former Capable | MU Beamfor-mee Capable | VHT TXOP PS | +HTC-VHT Capable | Maximum A-MPDU Length Exponent | VHT Link Adaptation Capable | Rx Antenna Pattern Consistency | Tx Antenna Pattern Consistency | Reserved |
| | (421) | (422) | (423) | (424) | (425) | (426) | (427) | (428) | (429) | (430) |
| | 3 | 1 | 1 | 1 | 1 | 3 | 2 | 1 | 1 | 2 |

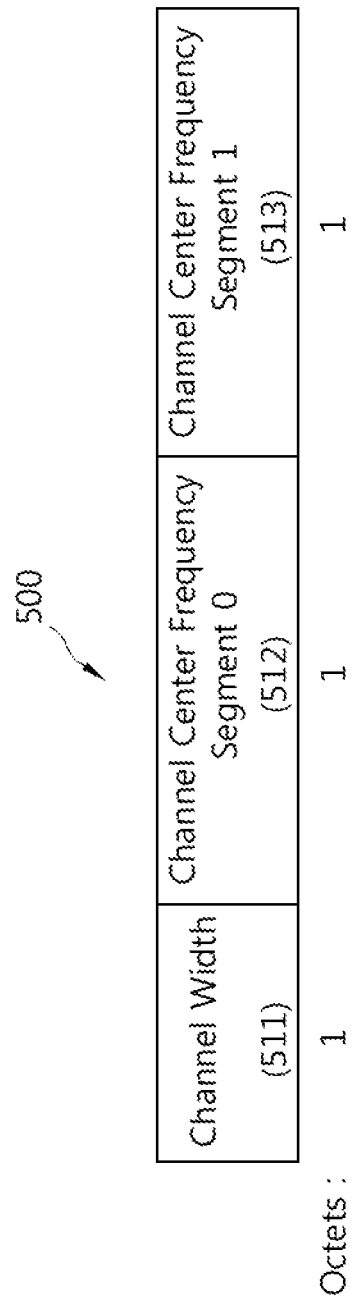

FIG. 7

| Category (310) | Spectrum Managment Action (320) | Channel Switch Announcement Element (330) | Secondary Channel Offset Element (340) | Mesh Channel Switch Parameters Element (350) | Wide Bandwidth Channel Switch Element (360) | New VHT Transmit Power Envelope Element (370) |
|---|---|---|---|---|---|---|
| 1 | 1 | 5 | 3 | 6 | 0 or 6 | variable |

Octets:

300

METHOD AND APPARATUS OF PEER LINK SETTING, AND METHOD AND APPARATUS OF CHANNEL SWITCHING, IN WIRELESS MESH NETWORK

CROSS-REFERENCE TO RELATED APPLICATIONS

This application claims the benefit of priority of Korean Patent Application No. 10-2011-0104860 filed on Oct. 13, 2011, Korean Patent Application No. 10-2011-0114104 filed on Nov. 3, 2011, Korean Patent Application No. 10-2012-0112825 filed on Oct. 11, 2012, Korean Patent Application No. 10-2011-0104859 filed on Oct. 13, 2011 and Korean Patent Application No. 10-2012-0112912 filed on Oct. 11, 2012, all of which are incorporated by reference in its entirety herein.

BACKGROUND OF THE INVENTION

1. Field of the Invention

The present invention relates to a mesh network, and more particularly, to a method of providing a very high throughput (VHT) wireless local area network (LAN) technology.

2. Related Art

An IEEE 802.11s based mesh network supports direct communication of a plurality of wireless devices having a relay function not via an access point (AP). In view of a function, a distribution system (DS) of an AP may be replaced by an interoperable wireless link or a multi-hop path among a plurality of APs. According to the mesh network, since a peer-to-peer wireless link in which one wireless device interacts with one or more adjacent wireless devices and/or APs may be configured, flexible wireless connection may be performed.

In the mesh network, one wireless device may be connected to a plurality of other wireless devices to have a plurality of communication paths. The communication paths among the wireless devices are referred to as wireless mesh links, mesh peer links, or peer links. The wireless devices are referred to as mesh points (MP), however, are not limited to the MPs. Among the MPs, MPs that perform the function of the AP as well as the above-described relay function are referred to as mesh access points (MAP).

The mesh network has advantages of flexibility in establishing the network, reliability by a detour route, and reduction in power consumption in accordance with reduction in a communication distance. Specifically, a flexible network may be established among the MPs even in a place where a communication network using the mesh network does not exist. In the mesh network, the plurality of MPs are connected to each other so that a plurality of detour routes may be secured. Therefore, although one MP is out of order, data may be transmitted through other paths. In addition, in the mesh network, although the communication coverage of one MP is not large, since communication may be performed via an adjacent MP, remote communication may be performed with low power.

An IEEE 802.11n wireless LAN technology is supported in the IEEE 802.11s based mesh network. The IEEE 802.11n as a standard technology relatively recently established in order to overcome limitations on communication speed that is the weak point of a wireless LAN is designed to increase the speed and reliability of a network and to extend the operation coverage of a wireless network. Specifically, the IEEE 802.11n is based on a multiple inputs and multiple outputs (MIMO) technology in which a plurality of antennas are adopted to a transmitter and/or a receiver in order to support high throughput (HT) having data throughput of maximum 600 Mbps, to minimize a transmission error, and to optimize a data rate.

As supply of the wireless LAN is activated and various applications use the wireless LAN, recently, a new wireless LAN technology of supporting higher throughput than data processing speed supported by the IEEE 802.11n is required. As a succeeding technology of the IEEE 802.11n, an IEEE 802.11ac VHT wireless LAN technology of supporting VHT is newly suggested. The VHT wireless LAN supports data processing speed of no less than 1 Gbps in an MAC service access point (SAP). The name of the VHT wireless LAN is arbitrary. In order to provide data throughput of no less than 1 Gbps, a reliability test for a VHT wireless LAN system in which 4×4 MIMO and 80 MHz channel bandwidth are used is being performed.

Therefore, a method of supporting the VHT wireless LAN technology in the IEEE 802.11s based mesh network is required.

SUMMARY OF THE INVENTION

An object of the present invention is to provide a method of exchanging very high throughput (VHT) capability information among mesh points (MP) in order to use a VHT wireless local access network (LAN) technology in a wireless mesh network.

Another object of the invention is to provide a method of using a wide bandwidth channel switch function of no less than 80 MHz provided by the VHT wireless LAN technology in the wireless mesh network and a method of controlling transmission power of VHT.

In an embodiment of the present invention, a method of configuring a mesh peer link in a wireless mesh network is provided. The method includes a first mesh station transmitting a mesh peering open frame to a second mesh station and the first mesh station receiving a mesh peering confirm frame from the second mesh station in response to the mesh peering open frame.

The first mesh station and the second mesh station may support a very high throughput (VHT), and the mesh peering open frame and the mesh peering confirm frame may comprise a VHT capability information element.

The mesh peering open frame and the mesh peering confirm frame may further comprise a VHT operation information element.

The first mesh station may perform passive scanning or active scanning in order to discover the second mesh station before transmitting the mesh peering open frame.

The VHT capability information element may comprise at least one of an information element indicating a maximum MAC protocol data unit (MPDU) length, an information element indicating a channel bandwidth supported by a station, an information element indicating whether an encoded packet is received by a low density parity check (LDPC), information elements indicating whether short guard intervals (GIs) are supported, an information element indicating whether reception of a PLCP protocol data unit (PPDU) using space time block coding (STBC) is supported, and an information element indicating whether a transmission opportunity (TXOP) power save mode is supported.

The VHT operation information element may comprise at least one of an information element indicating an operation channel bandwidth and an information element defining a channel center frequency.

In another embodiment of the present invention, a wireless device for supporting a method of configuring a mesh peer link in a wireless mesh network is provided. The wireless device includes a processor for generating and processing a frame and a transceiver connected to the processor to transmit and receive the frame generated by the processor.

The processor may generate a mesh peering open frame including a VHT capability information element to transmit the generated mesh peering open frame to the wireless device and a neighbor mesh station, and the processor may receive a mesh peering confirm frame including the VHT capability information element from the neighbor mesh station in response to the mesh peering open frame.

The mesh peering open frame and the mesh peering confirm frame may further comprise a VHT operation information element.

In still another embodiment of the present invention, a channel switch method in a wireless mesh network is provided. The method includes a first mesh station that is to be switched from a first channel to a second channel transmits a channel switch announcement frame to a second mesh station.

The first mesh station and the second mesh station may support a VHT, and the channel switch announcement frame may comprise a wide bandwidth channel switch element field and a mesh channel switch parameter element field.

The wide bandwidth channel switch element field may indicate performing switch to a channel bandwidth larger than 40 MHz.

The mesh channel switch parameter element field may indicate performing switch from the first channel to the second channel in the wireless mesh network.

In still another embodiment of the present invention, a wireless device for supporting a channel switch method in a wireless mesh network is provided. The wireless device includes a processor for generating and processing a frame and a transceiver connected to the processor to transmit and receive the frame generated by the processor.

When the wireless device performs switch from a first channel to a second channel, the processor may generate a channel switch announcement frame including a wide bandwidth channel switch element field and a mesh channel switch parameter element field.

The wide bandwidth channel switch element field may indicate performing switch to a channel bandwidth larger than 40 MHz, and the mesh channel switch parameter element field may indicate performing switch from the first channel to the second channel in the wireless mesh network.

In still another embodiment of the present invention, a method of determining maximum transmit power in a wireless mesh network is provided. The method includes a mesh station determines regulatory maximum transmit power (RMTP) regulated by each country for a currently used channel, the RMTP is a smaller value between first RMTP obtained by a country element received from a neighbor mesh station of the wireless mesh network or stations of other wireless LAN systems and second RMTP for a channel in a current regulatory domain, the mesh station determines local maximum transmit power (LMTP) for the currently used channel, and the LMTP is the smallest value among first LMTP obtained by a country element and a power constraint element received from a neighbor mesh station of the wireless mesh network or stations of other wireless LAN systems, second LMTP obtained by a VHT transmit power envelope element and an extended power constraint element received from a neighbor mesh station of the wireless mesh network or stations of other wireless LAN systems, and third LMTP for a channel in a current regulatory domain known from other sources.

The mesh station may publish the RMTP using the country element through a beacon frame and a probe response frame.

The mesh station may publish the LMTP using combination of the country element and the power constraint element or combination of the VHT transmit power envelope element and an extended power constraint element through the beacon frame and the probe response frame.

In the wireless mesh network, VHT wireless LAN based wireless transmission may be performed among the MPs and the wide bandwidth channel switch function of the VHT wireless LAN may be provided. Therefore, it is possible to provide better performance than the conventional wireless mesh network.

BRIEF DESCRIPTION OF THE DRAWINGS

FIG. 3 is a view illustrating an example of information items included in the mesh peering open frames used for the mesh peer link configuring process according to the embodiment of the present invention.

FIG. 4 is a view illustrating an example of information items included in the mesh peering confirm frames used for the mesh peer link configuring process according to the embodiment of the present invention.

FIG. 5 is a view illustrating an example of fields included in the VHT capability information element according to the embodiment of the present invention.

FIG. 6 is a view illustrating an example of the fields included in the VHT operation information according to the embodiment of the present invention.

FIG. 7 is a view illustrating a format of the channel switch announcement frame for supporting the wide bandwidth channel switch function according to an embodiment of the present invention.

DESCRIPTION OF EXEMPLARY EMBODIMENTS

Hereinafter, some embodiments of the present invention are described in detail with reference to the accompanying drawings in order for those skilled in the art to be able to readily implement the invention. Furthermore, the present invention is not limited to the following embodiments and may be modified in various ways within the scope of the technical spirit of the present invention.

Elements described in this specification may include additional elements other than elements to be described later, at need, and a detailed description of parts not directly related to the present invention or redundant parts is omitted. Furthermore, when it is said that any part includes (or comprises) any element, it means the part does not exclude other elements and may further include other elements.

Figure 1:
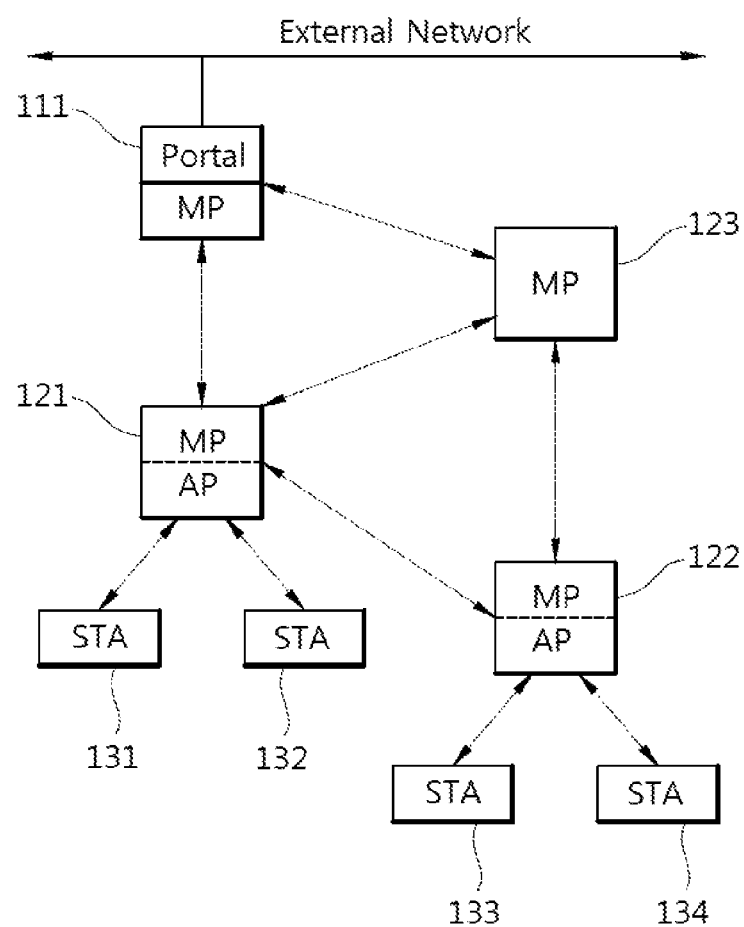
FIG. 1 is a view illustrating an example of a wireless mesh network according to an embodiment of the present invention.

FIG. 1 is a view illustrating an example of a wireless mesh network according to an embodiment of the present invention.

Referring to FIG. 1, a wireless mesh network includes one or a plurality of stations (STA) 131, 132, 133, and 134 and one or more wireless devices, that is, mesh points (MP) 111, 121, 122, and 123. Among the MPs, since the MPs 121 and 122 have the STAs 131, 132, 133, and 134 associated therewith, the MPs 121 and 122 become mesh access points (MAP) for simultaneously performing a function of access points (AP). The MP 111 wiredly or wirelessly connected to an external network is referred to as a mesh portal.

The STAs 131 to 134 as arbitrary functional media including medium access control (MAC) according to the regulation of the IEEE 802.11 standard and physical layer interface for wireless media are non-AP stations. The STAs 131 to 134 inform the MAP 121 or 122 associated therewith of multicast subscription information thereon. The STAs may be referred to as wireless transmit/receive units (WTRU), user equipments (UE), mobile stations (MS), or mobile subscriber units as well as wireless stations.

The MPs 111, 121, 122, and 123 as media for establishing the wireless mesh network are one of the functional media of the IEEE 802.11 including the MAC according to the regulation of the IEEE 802.11 standard and the physical layer interface. The MPs 111, 121, 122, and 123 are wireless devices supporting mesh services. The mesh services include various services by which direct communication may be performed among the MPs that form the mesh network. Communication between the two MPs for providing the mesh services, for example, the MPs 121 and 123 is performed through a mesh link or a peer link that is a direct link configured between the two MPs. According to the embodiment of the present invention, the MPs 111, 121, 122, and 123 support one or more VHT MACs and PHY features so that VHT of no less than 1 Gbps may be achieved.

Among the MPs 111, 121, 122, and 123, the MPs that perform the function of the APs are referred to as the MAPs. Therefore, the MAPs 121 and 122 perform the function of the APs for associated stations configured to be connected thereto as well as the function of the above-described MPs. The APs may be referred to as aggregation controllers, base stations (BS), node-Bs, or site controllers.

In the wireless mesh network illustrated in FIG. 1, an independent network formed of the MPs 111, 121, 122, and 123 for supporting the mesh services is referred to as a mesh basic service set (BSS). The BSS is a set of STAs that may communicate with each other in successful synchronization and is not a concept referring to a specific region. The MPs 111, 121, 122, and 123 in the mesh BSS may be referred to as a mesh STA.

The mesh BSS may be wiredly or wirelessly connected to an external network to form a wireless LAN system. For example, the mesh BSS may be connected to a network such as an infrastructure BSS and an independent BSS (IBSS) to communicate with the network.

The infrastructure BSS includes one or more non-AP STAs, an access point as an STA that provides a distribution service, and a distribution system (DS) for connecting a plurality of access points. In the infrastructure BSS, the AP STA manages the non-AP STAs of the BSS. Meanwhile, the IBSS operates in an ad-hoc mode. Since the IBSS does not include an AP, there is no centralized management entity that performs a management function in the center. That is, in the IBSS, the non-AP STAs are managed in a distributed manner. In the IBSS, all of the STAs may be formed of mobile stations and form a self-contained network since access to the DS is not allowed.

In order to provide very high speed wireless transmission of no less than 1 Gbps using a VHT wireless LAN technology in the mesh BSS, information indicating whether the MPs (hereinafter, referred to as mesh STAs) that form the mesh BSS according to the embodiment of the present invention are the mesh STAs supporting a VHT wireless LAN function is to be exchanged. In addition, the mesh STAs must be able to transmit and receive data using a wide bandwidth channel of no less than 80 MHz provided by the VHT wireless LAN technology. Hereinafter, methods in which the mesh STAs may use the VHT wireless LAN technology in the above-described mesh BSS will be described in detail with reference to the embodiment.

Figure 2:
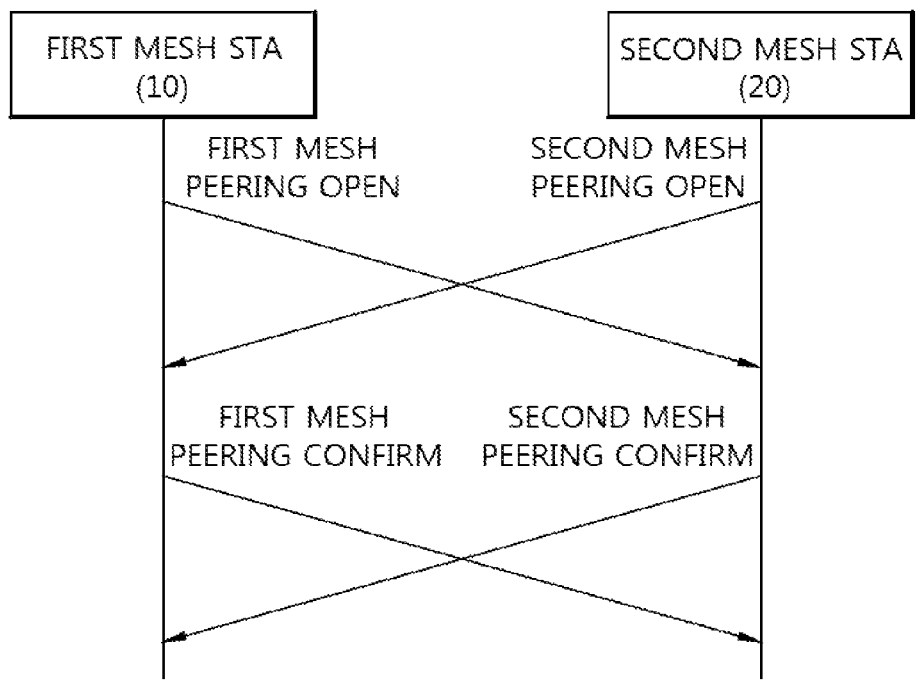
FIG. 2 is a message flowchart illustrating a mesh peer link configuring process according to an embodiment of the present invention.

FIG. 2 is a message flowchart illustrating a mesh peer link configuring process according to an embodiment of the present invention. The mesh peer link configuring process of FIG. 2 is performed after performing a mesh discovery process.

In the mesh discovery process, a mesh STA that desires to configure a peer link with another mesh STA searches a candidate mesh STA that may be a peer mesh STA or a neighbor mesh STA. Here, a mesh STA that forms the mesh BSS has a predetermined mesh profile. Therefore, a mesh searching process is a process of searching mesh STAs whose mesh profiles coincide with each other or whose mesh profiles may coincide with each other. A mesh profile includes a mesh identifier, a path selection protocol identifier, a path selection metric identifier, and a congestion control mode identifier.

Two methods are used for the mesh searching process. In a passive scan method as the first method, a mesh beacon frame transmitted from another mesh STA is used. That is, a mesh STA that desires to participate in the mesh BSS receives a mesh beacon frame periodically transmitted from another mesh STA to search a candidate mesh STA that desires to perform peering. In an active scan method as the second method, a mesh STA that desires to participate in the mesh BSS first transmits a mesh probe request frame. The mesh STA that receives the mesh probe request frame transmits a mesh probe response frame to a transmission mesh STA when the mesh STA desires to configure a peer link with the transmission mesh STA.

Mesh ID information is included in the mesh beacon frame or the mesh probe request/response frames. Mesh configuration information is included in the mesh beacon frame or the mesh probe response frame. A mesh STA that desires to configure a peer link may know mesh profile information of another mesh STA (a mesh STA that transmits the mesh beacon frame or a mesh STA that transmits the mesh response frame) using the mesh ID information and the mesh configuration information. In particular, the mesh configuration information is used for grasping information items other than the mesh ID information among the information items that form the mesh profile.

When neighbor mesh STAs are searched through the above-described mesh searching process, the mesh STA desires to configure a mesh link with the searched neighbor mesh STAs. In a mesh link configuring process, a logic link is configured among mesh STAs. The mesh link configuring process may be referred to as a peering process. In the mesh BSS, a peer link is configured through the peering process. A data frame may be transmitted and received only among the mesh STAs where the peer link is configured. In order to configure the mesh peer link among the mesh STAs, a mesh peering open frame and a mesh peering confirm frame are transmitted and received.

Referring to FIG. 2, a process of a first mesh STA 10 and a second mesh STA 20 configuring a peer link will be described.

The first mesh STA 10 transmits a first mesh peering open frame to the second mesh STA 20 and receives a first mesh peering confirm frame from the second mesh STA 20 in response to the first mesh peering open frame. The second mesh STA 20 transmits a second mesh peering open frame to the first mesh STA 10 and receives a second mesh peering confirm frame from the first mesh STA 10.

There are no limitations on the order of transmitting and receiving the first mesh peering open/confirm frames and the second mesh peering open/confirm frames. For example, the first mesh STA 10 may transmit the first mesh peering open frame before or after receiving the second mesh peering open frame from the second mesh STA 20 and may transmit the second mesh peering open frame before or after transmitting the second mesh peering confirm frame to the second mesh STAs 20 in response to the received second mesh peering open frame.

According to the embodiment of the present invention, information on capability of a wireless device related to the VHT service, that is, VHT capability information is included in the first and second mesh peering open frames and the first and second mesh peering confirm frames transmitted and received by the first mesh STA 10 and the second mesh STA 20. That is, information on capability related to the VHT wireless LAN function supported by the mesh STA is included in the mesh peering open frames and the mesh peering confirm frames used when the peer link is configured in the mesh BSS.

FIG. 3 is a view illustrating an example of information items included in the mesh peering open frames used for the mesh peer link configuring process according to the embodiment of the present invention. As described above, the mesh peering open frame is used for starting the mesh link configuring process.

The mesh peering open frames according to the present invention include all of the mesh peering open frame action field articles of the IEEE 802.11s, for example, category information, action value information, capability information, and supported rate information. In addition, when a predetermined condition is satisfied, extended support rate information, power capability information, supported channel information, robust security network (RSN) information, mesh ID information, mesh configuration information, mesh peering management information, and message integration code (MIC) information may be included.

In addition, when the mesh STA that supports the mesh peering open frames supports the VHT function, as illustrated in FIG. 3, a VHT capability information element and a VHT operation information element are included in the mesh peering open frames.

The VHT capability information element is for the mesh STA informing the opponent mesh STA that the mesh STA supports VHT MAC/PHY and for the mesh STA informing the opponent mesh STA of VHT capabilities supported thereby. The VHT operation information element is for the mesh BSS controlling the operation of the mesh STA that supports the VHT wireless LAN.

The order or number of fields of the VHT capability information and the VHT operation information illustrated in FIG. 3 is an example and the order or number of the fields may be changed as occasion demands.

FIG. 4 is a view illustrating an example of information items included in the mesh peering confirm frames used for the mesh peer link configuring process according to the embodiment of the present invention. As described above, the mesh peering confirm frames transmitted in response to the received mesh peering open frames are used to confirm mesh peering.

The mesh peering confirm frames according to the present invention include all of the mesh peering confirm frame action field articles of the IEEE 802.11s, for example, a category information element, an action value information element, a capability information element, an association identifier (AID) information element, and a supported rate information element. When a predetermined condition is satisfied, an extended support rate information element, a robust security network (RSN) information element, a mesh ID information element, a mesh configuration information element, a mesh peering management information element, and a MIC information element may be included.

In addition, when the mesh STA that supports the mesh peering confirm frames supports the VHT function, as illustrated in FIG. 4, VHT capability information element and VHT operation information element are included in the mesh peering confirm frames.

The VHT capability information element is for the mesh STA informing the opponent mesh STA that the mesh STA supports the VHT MAC/PHY and for the mesh STA informing the opponent mesh STA of the VHT capabilities supported thereby. The VHT operation information element is for the mesh BSS controlling the operation of the mesh STA that supports the VHT wireless LAN.

The order or number of fields of the VHT capability information and the VHT operation information illustrated in FIG. 4 is an example and the order or number of the fields may be changed as occasion demands.

Hereinafter, the structures the fields of the VHT capability information element and the VHT operation information element included in the mesh peering open frames and the mesh peering confirm frames to be transmitted will be described. The names and order of the fields included in the VHT capability information element and the VHT operation information element are arbitrary. The present invention is not limited to the names of the fields and the order of the fields.

FIG. 5 is a view illustrating an example of fields included in the VHT capability information element according to the embodiment of the present invention.

Referring to FIG. 5, a VHT capability information element 400 includes a maximum MAC protocol data unit (MPDU) length 411 indicating maximum MPDU length, a supported channel width set 412 indicating a channel bandwidth supported by a STA, an Rx low density parity check (LDPC) 413 indicating whether an encoded packet is received by an LDPC, short guard intervals (GI) 414 and 415 indicating whether short GIs are supported, a Tx space time block coding (STBC) 416 indicating whether transmission of at least 2×1 STBC is supported, an Rx STBC 417 indicating whether reception of a PLCP protocol data unit (PPDU) using the STBC is supported, an SU beamformer capable 418 indicating whether an operation of SU beamformer is supported, an SU beamformee capable 419 indicating whether an operation of SU beamformee is supported, a compressed steering number of beamformer antennas supported 420 indicating the maximum number of beamformer antennas supported in the SU beamformee capable, a number of sounding dimensions 421 indicating the maximum value of TXVECTOP parameter NUM_STS in the SU beamformer capable, an MU beamformer capable 422 indicating whether an operation of MU beamformer is supported, an MU beamformee capable 423 indicating whether an operation of MU beamformee is supported, a VHT transmission opportunity (TXOP) PS 424 indicating whether an AP supports a VHT TXOP power save mode or whether a non-AP STA is the VHT TXOP power save mode, a +HTC-VHT capable 425 indicating whether an STA supports reception of a VHT modified HT control field, a maximum A-MPDU length exponent 426 indicating the maximum length of A-MPDU supported by the STA, a VHT link adaptation capable 427 indicating whether the STA supports link adaptation using the VHT modified HT control field, an Rx antenna pattern consistency 428 indicating whether an Rx antenna pattern may be changed, and a Tx antenna pattern consistency 429 indicating whether a Tx antenna pattern may be changed.

All of the fields that may be included in the above-described VHT capability information element 400 are included or some of the fields may be included as occasion demands.

FIG. 6 is a view illustrating an example of the fields included in the VHT operation information according to the embodiment of the present invention.

Referring to FIG. 6, a VHT operation information element 500 may include at least one of a channel width 511 indicating an operation channel bandwidth, a channel center frequency segment 0 512 defining a channel center frequency for a 80 MHz or 160 MHz VHT BSS and a segment 0 channel center frequency for a 80+80 MHz VHT BSS, and a channel center frequency segment 1 513 defining a segment 1 channel center frequency for the 80+80 MHz VHT BSS.

The fields that may be included in the above-described VHT operation information element 500 may be included or some of the fields may be included.

In the conventional 802.11s based mesh BSS, although mesh STAs (hereinafter, referred to as VHT mesh STAs) that support the VHT wireless LAN function exist, information on whether the VHT services are supported among the mesh STAs and information on VHT capability supported by a corresponding STA may not be exchanged. However, the VHT mesh STAs according to the embodiment of the present invention may exchange VHT service information items when the mesh peer link is configured. That is, as illustrated in FIGS. 3 and 4, a function corresponding to a subset of VHT features is used among the VHT mesh STAs that configure mesh peering by extending the mesh peering open frames and the mesh peering confirm frames.

On the other hand, when the mesh STAs that form the mesh peer link or that desire to form the mesh peer link in the mesh BSS desire to change channels, it is necessary to inform a peer mesh STA that the mesh STAs that form the mesh peer link or that desire to form the mesh peer link in the mesh BSS desire to change channels. When communication is performed through the peer link like in the mesh BSS, communication may be performed only among mesh STAs having the same channel. Therefore, when a mesh STAS that desires to change a channel does not inform the peer mesh STA that the mesh STA desires to change the channel, the peer link of the peer mesh STA is unilaterally canceled by the mesh STA. Therefore, when the mesh STA desires to change the channel, first, the mesh STA preferably informs the peer mesh STA that the mesh STA desires to change the channel so that the peer mesh STA may determine whether to continuously maintain the peer link or to cancel the peer link. Therefore, in order for the mesh STA that desires to change the channel to inform the peer mesh STA that the mesh STA desires to change the channel, a channel switch announcement frame is transmitted to the peer mesh STA.

When the VHT mesh STA according to the embodiment of the present invention desires to change the channel, a channel bandwidth of no less than 80 MHz provided by an 802.11ac VHT wireless LAN technology must be able to be used. Therefore, according to the embodiment of the present invention, information items for supporting a wide bandwidth channel switch function to the channel switch announcement frame when the VHT mesh STA is changed into a new channel are included.

FIG. 7 is a view illustrating a format of the channel switch announcement frame for supporting the wide bandwidth channel switch function according to an embodiment of the present invention. The channel switch announcement frame is used for informing that the AP in the BSS or the mesh STA in the mesh BSS is changed into a new channel.

Referring to FIG. 7, a channel switch announcement frame 300 includes a category field 310, an action field 320, a channel switch announcement element field 330, and a secondary channel offset element field 340.

The category field 310 may include a value indicating a category to which the channel switch announcement frame 300 belongs, for example, a management category. The action field 320 may include a value indicating detailed action content according to the channel switch announcement frame 300, for example, spectrum management action. The channel switch announcement element field 330 used by mesh STAs in the mesh BSS to inform other mesh STAs when the mesh STAs are changed into new channels may include the numbers of new channels and a priority value determined by associations of the new channels. The secondary channel offset element field 340 for designating a secondary channel number in a channel to be changed may specify a secondary channel using a relative position with respect to a primary channel.

When the VHT mesh STA according to the embodiment of the present invention desires to change the channel, as illustrated in FIG. 7, the channel switch announcement frame 300 includes a mesh channel switch parameter element field 350 and a wide bandwidth channel switch element field 360.

The mesh channel switch parameter element field 350 for supporting a channel switch in the mesh BSS is included when the VHT mesh STA is changed from a first channel into a second channel in the mesh BSS. When the VHT mesh STA is changed into another channel excluding the mesh BSS, the mesh channel switch parameter element field 350 is not included in the channel switch announcement frame 300.

The wide bandwidth channel switch element field 360 for supporting the wide bandwidth channel switch of the VHT wireless LAN technology informs other mesh STAs that the VHT mesh STA is switched to a channel bandwidth larger than 40 MHz. That is, when the VHT mesh STA is changed into a channel bandwidth larger than 40 MHz, the wide bandwidth channel switch element field 360 may be included in the channel switch announcement frame 300.

The channel switch announcement frame 300 according to the embodiment of the present invention may further include a new VHT transmit power envelope element field 370. The new VHT transmit power envelope element field 370 may be formed to have the same type as a conventional VHT transmit power envelope element and includes a unique value of local maximum transmit power (LMTP) units interpretation. LMTP is the maximum transmit power that may be used by a corresponding BSS.

The new VHT transmit power envelope element field 370 indicates LMTP for the BSS of a bandwidth designated by designated units interpretation after changing a channel.

The order of the fields in the channel switch announcement frame 300 illustrated in FIG. 7, the number of octets of the fields, and the lengths of the fields are only an example. The order of the fields and the lengths of the fields may vary as occasion demands. In addition, the channel switch announcement frame 300 may further include fields other than the fields illustrated in FIG. 7 as occasion demands or do not always include the fields illustrated in FIG. 7.

Using the channel switch announcement frame according to the embodiment of the present invention, although the VHT mesh STA changes the channel as occasion demands, it is guaranteed so that a bandwidth of no less than 80 MHz may be used. Therefore, it is possible to obtain improved performance in the mesh BSS according to the present invention.

The mesh BSS according to the embodiment of the present invention controls transmit power for a currently used channel to reduce interference with other networks, for example, a BSS, an IBSS, and a personal basic service set (PBSS) and to support the bandwidth of no less than 80 MHz. Therefore, the mesh STA adaptively controls transmit power to efficiently manage radio wave resource, to reduce power consumption of the mesh STA, and to reduce consumption of a battery.

Figure 8:
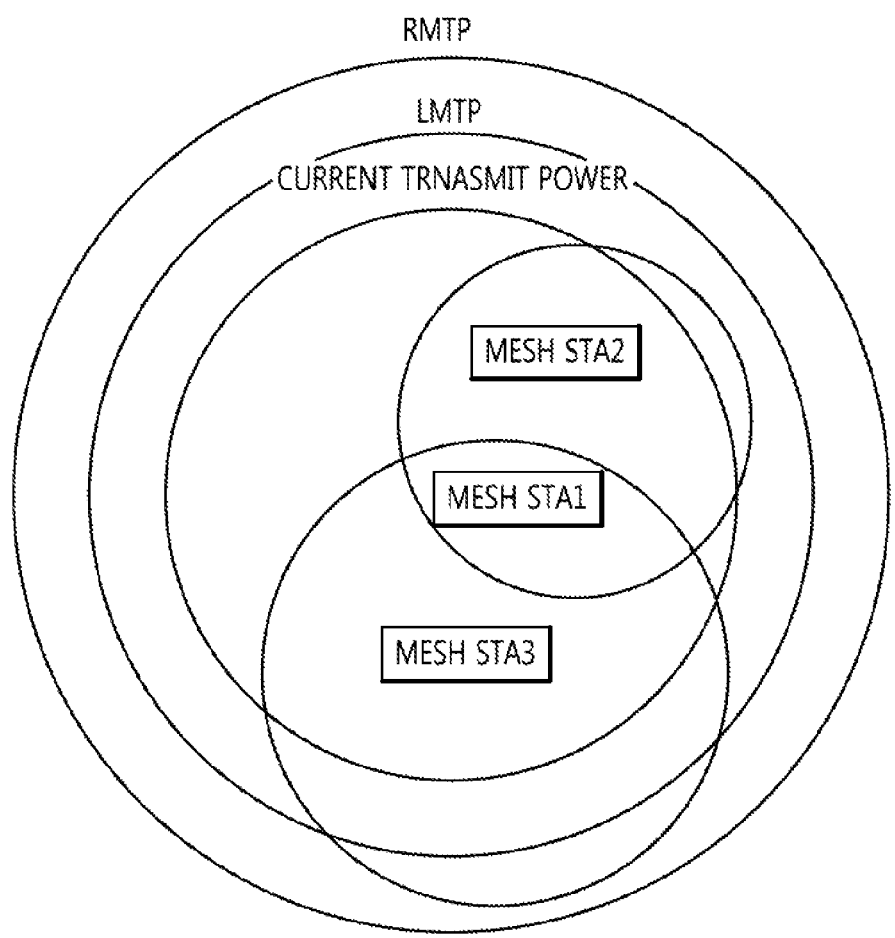
FIG. 8 is a view illustrating a mesh BSS to which transmit power control is applied.

FIG. 8 is a view illustrating a mesh BSS to which transmit power control is applied.

Referring to FIG. 8, the mesh BSS to which the transmit power control is applied may be divided into three transmit power ranges of regulatory maximum transmit power (RMTP), LMTP, and current transmit power (CTP).

The RMTP is the maximum transmit power regulated by each country.

The LMTP is the maximum transmit power that may be used for a corresponding mesh BSS and is configured as a smaller value than the RMTP in order to limit the maximum output of the corresponding mesh BSS and to protect other radio wave shared systems.

Current transmit power used among the mesh STAs is configured as a value smaller than or equal to the LMTP.

In the above-described transmit power control method, a mesh STA determines RMTP and LMTP for a currently used channel using the beacon frame and the probe response frame transmitted and received among the mesh STAs so that the maximum transmit power is controlled. In addition, according to the present invention, the maximum transmit power is controlled using a VHT transmit power envelope element and an extended power constraint element in order to provide a large channel bandwidth supported by the VHT wireless LAN.

Hereinafter, a method of the mesh STA determining the RMTP and the LMTP to control the maximum transmit power according to the embodiment of the present invention will be described in detail.

The mesh STA determines a smaller RMTP value between (i) and (ii) as an RMTP value for the currently used channel.

(i) RMTP obtained by a country element received from a neighbor mesh STA of the mesh BSS or STAs (for example, an AP in the BSS, a PBSS central point (PCP) in the PBSS, and other STAs in the IBSS) of other wireless LAN systems (ii) RMTP for a channel in a current regulatory domain known from other sources The mesh STA determines the smallest LMTP value among (i), (ii), and (iii) as the LMTP value for the currently used channel.

(i) LMTP obtained by a country element and a power constraint element received from a neighbor mesh STA of the mesh BSS or STAs (for example, an AP in the BSS, a PCP in the PBSS, and other STAs in the IBSS) of other wireless LAN systems (ii) LMTP obtained by a VHT transmit power envelope element and an extended power constraint element received from a neighbor mesh STA of the mesh BSS or STAs (for example, an AP in the BSS, a PCP in the PBSS, and other STAs in the IBSS) of other wireless LAN systems (iii) LMTP for the channel in a current regulatory domain known from other sources Here, the country element is information indicating that transmit power is regulated by frequency bandwidth in each country. The power constraint element is for regulating the LMTP. The VHT transmit power envelope element indicates the maximum transmit power for various channel bandwidth of the VHT mesh STA. The extended power constraint element defines LMTP for each channel bandwidth.

In the above, the method of the mesh STA in the mesh BSS determining the RMTP and the LMTP is described. However, the present invention is not limited to the above. For example, the present invention may be applied to an STA in the BSS, an STA in the IBSS, and a PCP in the PBSS.

On the other hand, the mesh STA must publish the RMTP for the currently used channel determined in the above, that is, an operating channel using the country element through the beacon frame and the probe response frame.

In addition, the mesh STA must publish the LMTP for the currently used channel determined in the above, that is, the operating channel using one of combination of the country element and the power constraint element and combination of the VHT transmit power envelope element and the extended power constraint element through the beacon frame and the probe response frame.

Here, STAs in other wireless systems such as an AP in the BSS and a STA in the IBSS as well as the mesh STA may publish the RMTP and the LMTP determined by the above-described transmit power control method through the beacon frame and the probe response frame.

The RMTP and the LMTP determined by the above-described transmit power control method may be changed in a period where the mesh BSS and the infrastructure BSS exist. However, how often and much the maximum value changes is to be determined in consideration of the stability of a network. The RMTP and the LMTP are not changed in a period where the IBSS exists.

In the VHT mesh STA according to the embodiment of the present invention, a mesh control field is included in a data frame in order to provide a mesh function. The maximum length of the frame body of the VHT mesh STA is calculated in consideration of the length of the mesh control field.

Figure 9:
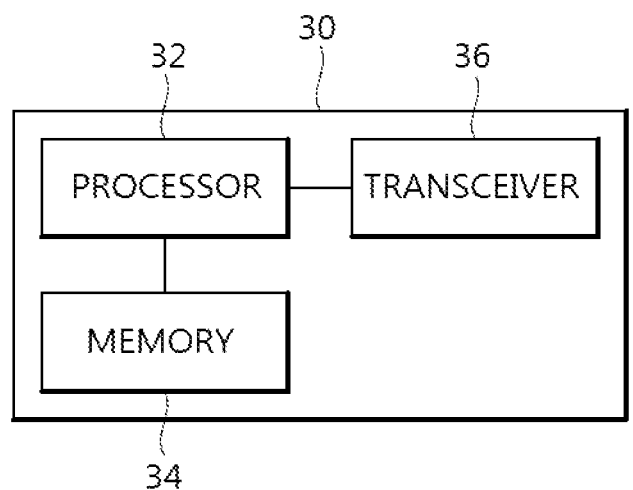
FIG. 9 is a block diagram illustrating a wireless device according to an embodiment of the present invention.

FIG. 9 is a block diagram illustrating a wireless device according to an embodiment of the present invention. The wireless device may be the mesh STA.

Referring to FIG. 9, a wireless device 30 includes a processor 32, a memory 34, and a transceiver 36.

The transceiver 36 transmits/receives a radio signal to realize the physical layer of the IEEE 802.11. For example, a physical layer supporting the VHT may be realized.

The processor 32 is functionally connected to the transceiver 36 to realize the MAC layer of the IEEE 802.11.

The processor 32 generates and transmits the mesh peering open/confirm frames including the VHT capability information element and the VHT operation information element suggested by the present invention or interprets the field values of the VHT capability information element and the VHT operation information element included in the received mesh peering open/confirm frames so that the wireless device 30 may support the VHT function.

The processor 32 generates and transmits the channel switch announcement frame including the wide bandwidth channel switch element and the mesh channel switch parameter element to support the wide bandwidth channel switch function suggested by the present invention.

The processor 32 may be realized to determine the RMTP and the LMTP for the currently used channel suggested by the present invention and to control the maximum transmit power.

That is, the processor 32 may be configured to realize the above-described embodiments of the present invention.

The processor 32 and/or the transceiver 36 may include an application-specific integrated circuit (ASIC), another chip set, a logic circuit, and/or a data processing device. The memory 34 may include a read only memory (ROM), a random access memory (RAM), a flash memory, a memory card, a storage medium, and/or another storage device. When the embodiments are realized by software, the above-described method may be realized by a module (a process and a function) that performs the above-described function. The module may be stored in the memory 34 and may be executed by the processor 32. The memory 34 may be in or outside the processor 32 and may be connected to the processor 32 by various well-known means.

On the other hand, the architecture of a medium access control (MAC) secondary layer includes a distributed coordination function (DCF), a point coordination function (PCF), and a hybrid coordination function (HCF). The HCF includes a contention based channel access method referred to as enhanced distributed channel access (EDCA) and a non-contention based channel access method referred to as HCF controlled channel access (HCCA). In the EDCA mechanism, contention may be performed in order to obtain a TXOP. That is, the MPs or the STAs obtain the TXOP when EDCA contention is successful. The TXOP may be allotted by a hybrid coordinator (HC).

When a specific MP or a specific STA has a right to initiate transmission to a wireless medium, the TXOP is used to provide and guarantee uniform time for which the specific MP or the specific STA may transmit a frame at intervals where the right continues.

The STA that supports the IEEE 802.11 standard may be in one of an awake state where the STA receives power enough to perform all of the functions including a function of transmitting/receiving a frame and a doze state or a sleep state where the STA uses a low amount of power instead of constraining the function of transmitting/receiving the frame in order to manage its power.

The STA may be in an active mode and a power save (PS) mode in order to manage power. In the active mode, the STA operates in the awake state. In the PS mode, the STA operates to reduce the use of power by being switched between the awake state and the doze state as occasion demands. For example, in the case where the STA is in the PS mode, the STA may be in the doze state to minimize the use of power when the STA does not transmit the frame to/receive the frame from the AP or another STA. When it is necessary for the STA to transmit the frame or the STA is requested to receive the frame, the STA enters the awake state to transmit/receive the frame and may return to the doze state after completing transmitting/receiving the frame.

That is, the STA may operate in the PS mode in a TXOP period by being switched between the awake state and the doze state. Hereinafter, in describing the present invention, the STA operating in the TXOP period by being switched between the awake state and the doze state is referred to as a TXOP PS mode.

The conventional TXOP PS mode is limited to being applied only to transmission from the AP to the STA. It is indicated whether the AP allows the TXOP PS mode or whether the STA is in the TXOP PS mode through association between the AP and the STA. On the other hand, in the mesh network illustrated in FIG. 1, since not the association but the peer link is performed among the MPs, the TXOP PS mode may not be used. Therefore, according to the present invention, a method, in which information on the TXOP PS mode may be exchanged among the MPs (hereinafter, referred to as mesh STAs) during the peer link so that the TXOP PS mode of the mesh STAs may be applied in the wireless mesh network, is provided.

Figure 10:
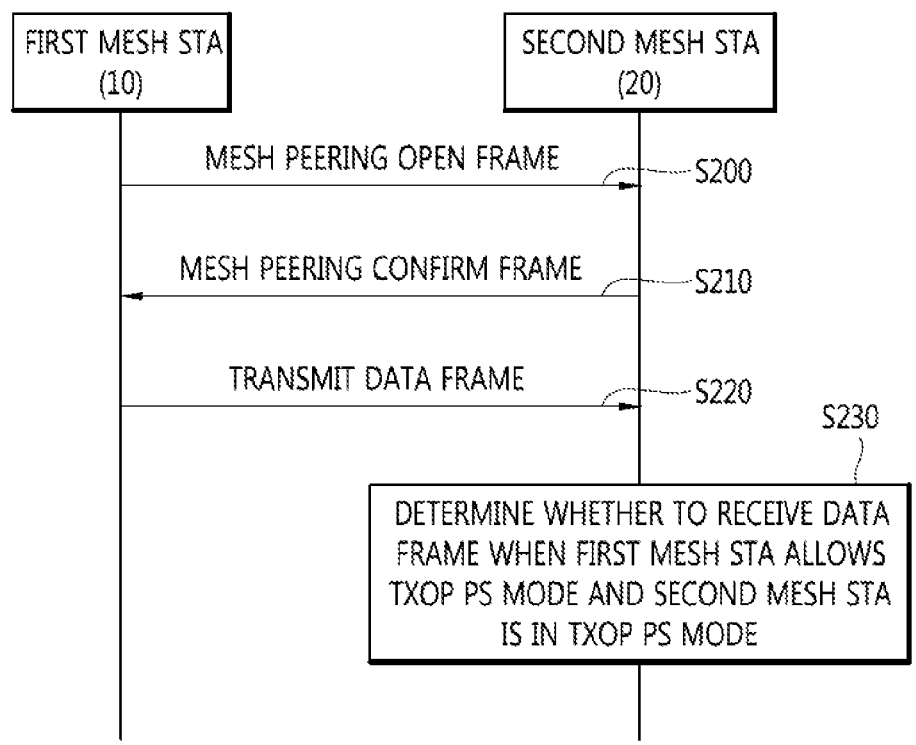
FIG. 10 is a flowchart illustrating a method of providing the TXOP PS mode of the mesh STAs according to the embodiment of the present invention.

FIG. 10 is a flowchart illustrating a method of providing the TXOP PS mode of the mesh STAs according to the embodiment of the present invention.

FIG. 10 illustrates processes of a first mesh STA 10 and a second mesh STA 20 configuring the peer link to operate in the TXOP PS mode. A mesh peering open frame is used to initiate a mesh peer link procedure. A mesh peering confirm frame as a frame transmitted in response to the received mesh peering open frame is used to confirm mesh peering.

Referring to FIG. 10, the first mesh STA 10 transmits the mesh peering open frame to the second mesh STA 20 (S200) and receives the mesh peering confirm frame from the second mesh STA 20 in response to the mesh peering open frame (s210).

The second mesh STA 20 may transmit the mesh peering open frame to the first mesh STA 10 and may receive the mesh peering confirm frame from the first mesh STA 10 in response to the mesh peering open frame.

According to the embodiment of the present invention, information on the TXOP PS mode is included in the mesh peering open frame and the mesh peering confirm frame that the first mesh STA 10 and the second STA 20 transmit and receive. That is, a VHT TXOP PS bit in a VHT capability information field provided in the IEEE 802.11ac standard is included. Whether the first mesh STA 10 and the second mesh STA 20 allow the TXOP PS mode and whether the first mesh STA 10 and the second mesh STA 20 use the TXOP PS mode are indicated using the VHT TXOP PS bit.

In the case where the value of the VHT TXOP PS bit in the VHT capability information field is configured to indicate that the TXOP PS mode is allowed when the first mesh STA 10 transmits the mesh peering open frame and is configured to indicate that the TXOP PS mode is used when the second mesh STA 20 transmits the mesh peering confirm frame, when the first mesh STA 10 transmits a data frame in the TXOP period (S220), the second mesh STA 20 determines whether to receive the data frame (S230).

For example, the second mesh STA 20 may confirm a partial address identifier (AID) included in the data frame, that is, a receiver address (RA) to determine whether the data frame is transmitted thereto. When the RA included in the data frame is the RA of the second mesh STA 20, the second mesh STA 20 is switched to the awake state to receive the data frame. When the RA included in the data frame is not the RA of the second mesh STA 20, the second mesh STA 20 operates in the doze state in the TXOP period. Here, since the partial AID is defined by the MAC address of a receiver, the receiver of the data frame may be identified. Therefore, when the mesh STAs according to the embodiment of the present invention operate in the TXOP PS mode, the partial AID of the received data frame is confirmed in a physical layer so that power may be saved in the physical layer.

The mesh peering open frame according to the present invention further includes the VHT capability information elements including the VHT TXOP PS field that indicates whether the mesh STAs allow the TXOP PS mode and whether the mesh STAs use the TXOP PS mode as illustrated in FIG. 3. The order numbers of the VHT capability information elements illustrated in FIG. 3 are only an example and may vary as occasion demands.

In addition, the mesh peering confirm frame according to the present invention further includes the VHT capability information elements including the VHT TXOP PS field that indicates whether the mesh STAs allow the TXOP PS mode and whether the mesh STAs use the TXOP PS mode as illustrated in FIG. 4. The order numbers of the VHT capability information elements illustrated in FIG. 4 are only an example and may vary as occasion demands.

Here, the VHT capability information elements included in the mesh peering open frame and the mesh peering confirm frame may be configured as illustrated in FIG. 5 and whether the mesh STAs allow the TXOP PS mode and whether the mesh STAs use the TXOP PS mode may be indicated using the VHT TXOP PS field 424 in the VHT capability information elements.

As described above, the mesh STAs according to the embodiment of the present invention transmit and receive the mesh peering open frame and the mesh peering confirm frame with information on the TXOP PS mode thereof during the configuration of the peer link so that the power of the mesh STAs may be saved. However, when the mesh STAs desire to change the TXOP PS mode after configuring the peer link, for example, when the mesh STAs do not operate in the TXOP PS mode and desire to be switched to the TXOP PS mode with reduction in the amount of power of a battery or operate in the TXOP PS mode and desire to deviate from the TXOP PS mode in order to increase transmission efficiency, the peer link must be configured again.

Hereinafter, in order to solve the above-described problem, a method of dynamically changing the TXOP PS mode will be described.

Figure 11:
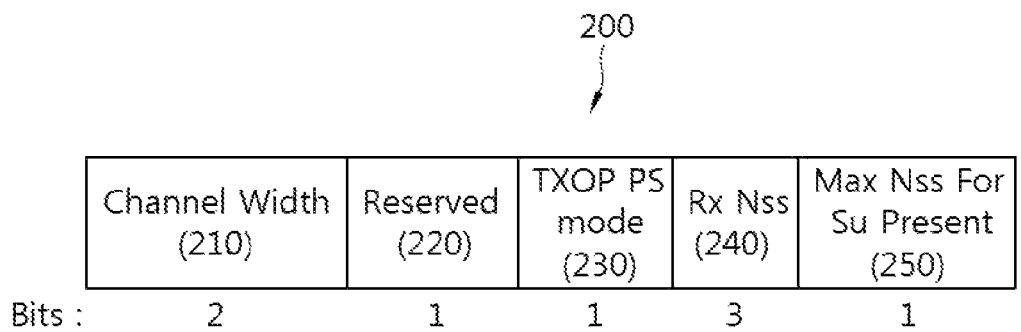
FIG. 11 is a view illustrating an example a VHT operating mode field included in a VHT operating mode notification frame for changing the TXOP PS mode according to an embodiment of the present invention.

FIG. 11 is a view illustrating an example a VHT operating mode field included in a VHT operating mode notification frame for changing the TXOP PS mode according to an embodiment of the present invention.

The VHT operating mode notification frame is used for the STA that transmits the VHT operating mode notification frame to notify other STAs of an operating channel width and/or the number of spatial streams (SS) that the STA may receive.

According to the present invention, the VHT operating mode field 200 in the VHT operating mode notification frame illustrated in FIG. 11 is extended to notify a change in the TXOP PS mode among the mesh STAs.

Referring to FIG. 11, the VHT operating mode field 200 in the VHT operating mode notification frame includes a channel width field 210 for indicating an operating channel width, a reserved field 220, a TXOP PS mode field 230 for indicating whether the STA is in the PS mode, an Rx Nss field 240 for indicating the number of SSs (spatial streams) that the transmitting STA may receive, and a Max Nss for SU present field 250 for indicating the maximum number of SSs for SU.

When the mesh STAs in the wireless mesh network according to the embodiment of the present invention desire to change the TXOP PS mode after configuring the peer link, whether the TXOP PS is allowed and whether the TXOP PS mode is used may be changed using the bit value of the TXOP PS mode 230 in the VHT operating mode field 200. For example, the bit value of the TXOP PS mode field 230 may be configured as 0 to indicate that the TXOP PS mode is not used or allowed and may be configured as 1 to indicate that the TXOP PS mode is used or allowed.

It is configured to indicate whether the TXOP PS mode is used and whether the TXOP PS mode is allowed in accordance with the bit value 0 or 1 of the TXOP PS mode field 230 is only an example and the present invention is not limited to the above.

The method of the mesh STAs changing the TXOP PS mode using the bit of the TXOP PS mode field 230 in the VHT operating mode field 200 according to the embodiment of the present invention was described. However, the present invention is not limited to the above. The method may be applied to an AP and an STA of a wireless LAN system such as an infrastructure BSS and an independent BSS (IBSS) as well as the mesh STAs.

For example, when the STA in the wireless LAN system desires to change the TXOP PS mode thereof, the bit value of the TXOP PS mode field 230 in the VHT operating mode field 200 is configured as 0 or 1 to indicate that the TXOP PS mode is used or is not used. That is, the STA may change the TXOP PS mode thereof using the bit value of the TXOP PS mode field 230 in the VHT operating mode field 200 and may transmit the VHT operating mode notification frame to other STAs to notify the other STAs of the change.

When the AP in the wireless LAN system desires to change whether the TXOP PS mode thereof is allowed, the bit value of the TXOP PS mode field 230 in the VHT operating mode field 200 may be configured as 0 or 1 to indicate that the TXOP PS mode is allowed or is not allowed. That is, the AP may change the TXOP PS mode thereof using the bit value of the TXOP PS mode field 230 in the VHT operating mode field 200 and may transmit the VHT operating mode notification frame to all of the STAs in the BSS to notify the STAs of the change. At this time, the AP may transmit the VHT operating mode notification frame to all of the STAs in the BSS using a broadcast RA.

Hereinafter, a method of exchanging information on the TXOP PS mode among the mesh STAs using a diagnostic reporting function of the IEEE 802.11v standard that provides various functions for managing a wireless network is provided. In the diagnostic reporting function, the states of the STAs on the wireless network may be reported. Diagnostic report on the states of the STAs is performed by exchanging a diagnostic request element and a diagnostic response element. Various diagnostic information subelements are included in the diagnostic request element and the diagnostic response element. The diagnostic information subelements include information elements on the PS mode. According to the present invention, furthermore, a method of reporting information on the TXOP PS mode is provided.

Figure 12:
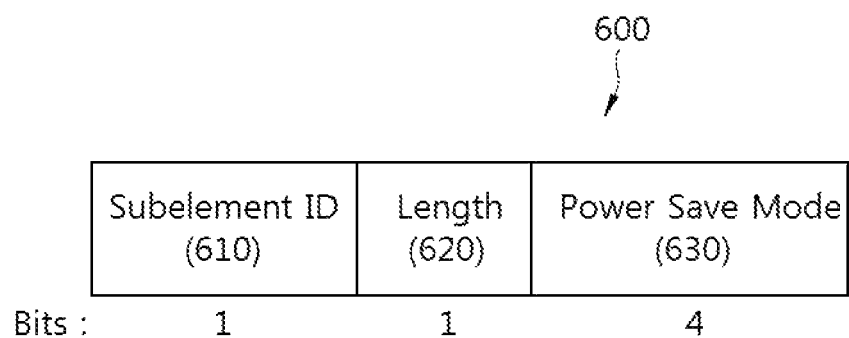
FIG. 12 is a view illustrating the fields of a PS mode subelement included in a diagnostic information subelement for reporting information on the TXOP PS mode according to an embodiment of the present invention.

FIG. 12 is a view illustrating the fields of a PS mode subelement included in a diagnostic information subelement for reporting information on the TXOP PS mode according to an embodiment of the present invention.

Referring to FIG. 12, the PS mode subelement 600 including information on the PS mode in the diagnostic information subelement includes a subelement ID 610 for indicating the identifier of a subelement, a length 620 for indicating the length of the PS mode subelement 600, and a PS mode 630 for indicating information on the PS mode.

The PS mode 630 of the PS mode subelement 600 according to the embodiment of the present invention includes a field indicating the information on the TXOP PS mode in order to report the information on the TXOP PS mode of the mesh STAs. The following table 1 illustrates an example of information included in the PS mode 630 subelement according to the present invention.

TABLE 1

| Power Save Mode | Bit |
|---|---|
| Unknown | 0 |
| None | 1 |
| PS mode (ReceiveDTIMs = 1) | 2 |
| PS mode (ReceiveDTIMs = 0) | 3 |
| U-APSD | 4 |
| S-APSD | 5 |
| U-PSMP | 6 |
| S-PSMP | 7 |
| SM Power Save | 8 |
| WNM-Sleep Mode | 9 |
| FMS | 10 |
| TIM Broadcast | 11 |
| TFS | 12 |
| TDLS Peer U-APSD | 13 |
| TDLS Peer PSM | 14 |
| TXOP Power Save | 15 |
| Reserved | 16~31 |

The PS mode 630 subelement includes all of the information elements provided by the IEEE 802.11v, that is, the other information elements excluding the TXOP Power Save element illustrated in the table 1. In order to report the information on the TXOP PS mode of the mesh STAs according to the embodiment of the present invention, in the PS mode 630 of the IEEE 802.11v, one bit among reserved bits 15 to 31 bits is allotted as a bit for indicating the information on the TXOP PS mode. For example, as illustrated in the table 1, a TXOP PS field for reporting the information on the TXOP PS mode of the mesh STAs may be allotted to the 15 bits of the PS mode 630 subelement.

Therefore, after the mesh STAs configure the peer link, when a mesh STA desires to report the information on the TXOP PS mode thereof or to obtain the information on the TXOP PS mode of another mesh STA, information on whether the TXOP PS mode is used or allowed is configured using the bit value of the TXOP PS field in the PS mode subelement and the diagnostic request element and the diagnostic response element are exchanged so that the information on the TXOP PS mode may be transmitted and received among the mesh STAs.

The method of reporting the information on the TXOP PS mode of the mesh STAs using the bit value of the PS mode 630 field of the PS mode subelement 600 according to the embodiment of the present invention was described. However, the present invention is not limited to the above. The method may be applied to the AP and the STA of the wireless LAN system such as the infrastructure BSS and the independent BSS (IBSS) as well as the mesh STAs.

For example, when the AP or the STA desires to report the information on the TXOP PS mode thereof or to obtain the information on the TXOP PS mode of another AP or STA, the information on the TXOP PS mode may be configured using the value of the TXOP PS field in the PS mode 630 field and may be reported by exchanging the diagnostic request element and the diagnostic response element between the APs and the STAs in the BSS. As described above, according to the present invention, a wireless LAN STA is supported to dynamically change the TXOP PS mode and to exchange the information on the TXOP PS mode so that the wireless LAN STA may save power.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. A method of configuring a mesh peer link in a wireless mesh network, the method comprising:
    a first mesh station transmitting a mesh peering open frame to a second mesh station; and
    the first mesh station receiving a mesh peering confirm frame from the second mesh station in response to the mesh peering open frame,
    wherein the first mesh station and the second mesh station support a very high throughput (VHT),
    wherein the mesh peering open frame and the mesh peering confirm frame each includes a VHT capability information element, and
    wherein each VHT capability information element includes at least one of an information element indicating a maximum MAC protocol data unit (MPDU) length, an information element indicating a channel bandwidth supported by a station, an information element indicating whether an encoded packet is received by a low density parity check (LDPC), an information element indicating whether a short guard interval (GI) is supported, an information element indicating whether reception of a Physical Layer Convergence Procedure (PLCP) protocol data unit (PPDU) using space time block coding (STBC) is supported, and an information element indicating whether a transmission opportunity (TXOP) power save mode is supported.

2. The method of claim 1, wherein the mesh peering open frame and the mesh peering confirm frame each includes a VHT operation information element.

3. The method of claim 1, wherein the first mesh station performs passive scanning or active scanning in order to discover the second mesh station before transmitting the mesh peering open frame.

4. The method of claim 2, wherein each VHT operation information element includes at least one of an information element indicating an operation channel bandwidth and an information element defining a channel center frequency.

5. The method of claim 1, further comprising
    the first mesh station configuring a mesh peer link supporting the VHT with the second mesh station,
    wherein the first mesh station recognizes that the second mesh station supports the VHT and is informed of the second mesh station's VHT features from the VHT capability information element included in the mesh peering confirm frame, and
    wherein the second mesh station recognizes that the first mesh station supports the VHT and is informed of the first mesh station's VHT features from the VHT capability information element included in the mesh peering open frame.

6. A wireless device for supporting a method of configuring a mesh peer link in a wireless mesh network, the wireless device comprising:
- a processor configured for generating and processing frames; and
- a transceiver connected to the processor and configured to transmit and receive the frames,
- wherein the processor is configured to generate a mesh peering open frame including a first VHT capability information element and to transmit the generated mesh peering open frame to a neighbor mesh station,
- wherein the processor is configured to receive a mesh peering confirm frame including a second VHT capability information element from the neighbor mesh station in response to the mesh peering open frame, and
- wherein each of the first and second VHT capability information elements includes at least one of an information element indicating a maximum MAC protocol data unit (MPDU) length, an information element indicating a channel bandwidth supported by a station, an information element indicating whether an encoded packet is received by a low density parity check (LDPC), an information element indicating whether a short guard interval (GI) is supported, an information element indicating whether reception of a Physical Layer Convergence Procedure (PLCP) protocol data unit (PPDU) using space time block coding (STBC) is supported, and an information element indicating whether a transmission opportunity (TXOP) power save mode is supported.

7. The wireless device of claim 6, wherein the mesh peering open frame and the mesh peering confirm frame each further include a VHT operation information element.

8. The wireless device of claim 6,
- wherein the processor is configured to configure a mesh peer link supporting the VHT with the neighbor mesh station and to recognize that the neighbor mesh station supports the VHT, and
- wherein the processor is configured to be informed of the neighbor mesh station's VHT features from the VHT capability information element included in the mesh peering confirm frame.

* * * * *